United States Patent
Hu et al.

(10) Patent No.: US 9,958,059 B2
(45) Date of Patent: May 1, 2018

(54) CONTROL SYSTEM AND METHOD FOR NEUTRAL IDLE OPERATION

(71) Applicant: Ford Global Technologies, LLC, Dearborn, MI (US)

(72) Inventors: Guopeng Hu, Northville, MI (US); Zhengyu Dai, Canton, MI (US); Yang Xu, Dearborn, MI (US); Weitian Chen, Windsor (CA); Hong Jiang, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 15/256,989

(22) Filed: Sep. 6, 2016

(65) Prior Publication Data

US 2018/0066748 A1    Mar. 8, 2018

(51) Int. Cl.
| | |
|---|---|
| *F16H 61/02* | (2006.01) |
| *F16H 3/66* | (2006.01) |
| *F16H 59/44* | (2006.01) |
| *F16H 59/66* | (2006.01) |

(52) U.S. Cl.
CPC .......... *F16H 61/0213* (2013.01); *F16H 3/66* (2013.01); *F16H 2059/446* (2013.01); *F16H 2059/666* (2013.01); *F16H 2200/0052* (2013.01); *F16H 2200/201* (2013.01); *F16H 2200/2043* (2013.01); *F16H 2200/2066* (2013.01); *F16H 2200/2082* (2013.01); *F16H 2312/14* (2013.01)

(58) Field of Classification Search
CPC .... F16H 2059/446; F16H 59/54; F16H 59/60; F16H 2059/666; F16H 2312/14; F16H 2312/16

See application file for complete search history.

(56) References Cited

U.S. PATENT DOCUMENTS

| | | | |
|---|---|---|---|
| 2,314,554 A * | 3/1943 | Pennington | B60K 23/02 192/3.33 |
| 6,440,041 B1 | 8/2002 | Riedle et al. | |
| 8,099,220 B2 * | 1/2012 | Kim | F16H 61/0213 477/97 |

(Continued)

FOREIGN PATENT DOCUMENTS

WO    2011117141 A1    9/2011

*Primary Examiner* — Sherry L Estremsky
(74) *Attorney, Agent, or Firm* — James Dottavio; Brooks Kushman P.C.

(57) ABSTRACT

A vehicle includes an engine and driven wheels each having an associated friction brake. A brake pedal is operable to engage the friction brakes. The vehicle includes a transmission having an input shaft driveably connected to the engine, an output element driveably connected to the driven wheels, and a gear mechanism adapted to establish at least one torque flow path between the input shaft and the output element. The transmission further includes a shift element that interrupts the torque flow path when disengaged. A gear selector is disposed in the passenger cabin and includes at least one forward-drive position, a reverse position, and a neutral position. At least one vehicle controller is configured to, in response to the gear selector being in the forward-drive position, a speed of the vehicle being zero, the vehicle being within a first predefined distance of a stoplight, and the brake pedal being depressed, disengage the shift element to put the transmission in neutral idle.

16 Claims, 5 Drawing Sheets

(56) References Cited

U.S. PATENT DOCUMENTS

| | | | |
|---|---|---|---|
| 8,406,975 B2* | 3/2013 | Ishiwada | F16H 59/72 |
| | | | 477/76 |
| 8,527,163 B2* | 9/2013 | Staudinger | F16H 61/0213 |
| | | | 477/91 |
| 9,074,572 B2* | 7/2015 | Albertson | B60W 10/06 |
| 9,151,263 B2 | 10/2015 | Hrovat et al. | |
| 2015/0175149 A1 | 6/2015 | Zhao et al. | |
| 2017/0349179 A1* | 12/2017 | Cunningham | B60W 30/181 |

* cited by examiner

CONTROL SYSTEM AND METHOD FOR NEUTRAL IDLE OPERATION

TECHNICAL FIELD

This disclosure relates to a motor vehicle including a transmission having a neutral-idle operation. The neutral-idle operation of the transmission is controlled based on road data.

BACKGROUND

Motor vehicles include a powertrain that transmits torque to the driven wheels to propel the vehicle. The powertrain includes an engine and a transmission. The transmission is operable to change a speed ratio between an input connected to the engine and an output shaft connected to the driven wheels. The speed ratios are created by planetary gear sets disposed within the gear box. A series of clutches and brakes control the planetary gear sets to establish one or more power flow paths between the input and output shafts.

The transmission includes an associated gear shifter disposed within a passenger compartment of the vehicle. The gear shifter includes a plurality of positions such as PARK, REVERSE, NEUTRAL, and DRIVE. Movement of the gear shifter causes one or more of the clutches and brakes to engage or disengage placing the transmission in the desired state. When the gear shifter is in NEUTRAL, all of the controllable clutches of the transmission are disengaged to isolated the input and output shafts from each other.

Some transmissions include a neutral-idle operation in which the vehicle controller automatically places the vehicle in NEUTRAL when the vehicle is stopped with the brake pedal depressed and the gear shifter in DRIVE. Providing neutral-idle operation improves fuel economy by reducing the workload on the engine when the vehicle is stopped in gear. Some neutral-idle systems include a delay timer that inhibits neutral idle during stops of short duration.

SUMMARY

According to one embodiment, a vehicle includes an engine and driven wheels each having an associated friction brake. A brake pedal is operable to engage the friction brakes. The vehicle includes a transmission having an input element driveably connected to the engine, an output element driveably connected to the driven wheels, and a gear mechanism adapted to establish at least one torque flow path between the input element and the output element. The transmission further includes a shift element that interrupts the torque flow path when disengaged. A gear selector is disposed in the passenger cabin and includes at least one forward-drive position, a reverse position, and a neutral position. At least one vehicle controller is configured to, in response to the gear selector being in the forward-drive position, a speed of the vehicle being zero, the vehicle being within a first predefined distance of a stoplight, and the brake pedal being depressed, disengage the shift element to put the transmission in neutral idle.

According to another embodiment, a vehicle includes a transmission having an input element, an output shaft, and a shift element that interrupts torque flow between the shafts when disengaged. A controller is configured, in response to a speed of the vehicle being zero, the vehicle being within a predefined distance of an ahead stoplight, and a gear selector of the transmission being in a forward-drive position, disengage the shift element.

According to a further embodiment, a vehicle includes an engine and a transmission driveably connected to the engine and including a forward-drive state and a neutral state. A controller is configured to, in response to a speed of the vehicle being zero, the vehicle being within a predefined distance of an ahead stoplight, a brake pedal being applied, and a gear selector being in a position that instructs the transmission to the forward-drive state, shift the transmission to the neutral state.

According to yet another embodiment, a method of operating a vehicle having a transmission with a neutral-idle state is disclosed. The method includes shifting a transmission to a forward-drive gear in response to a gear selector being in a drive position. The method further includes engaging a brake system according to inputs from a brake pedal. The method also includes in response to the brake system being engaged, the vehicle being within a predefined distance of a stoplight, and the gear selector being in DRIVE, disengaging a shift element associated with the forward-drive gear to place transmission in a neutral-idle state.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
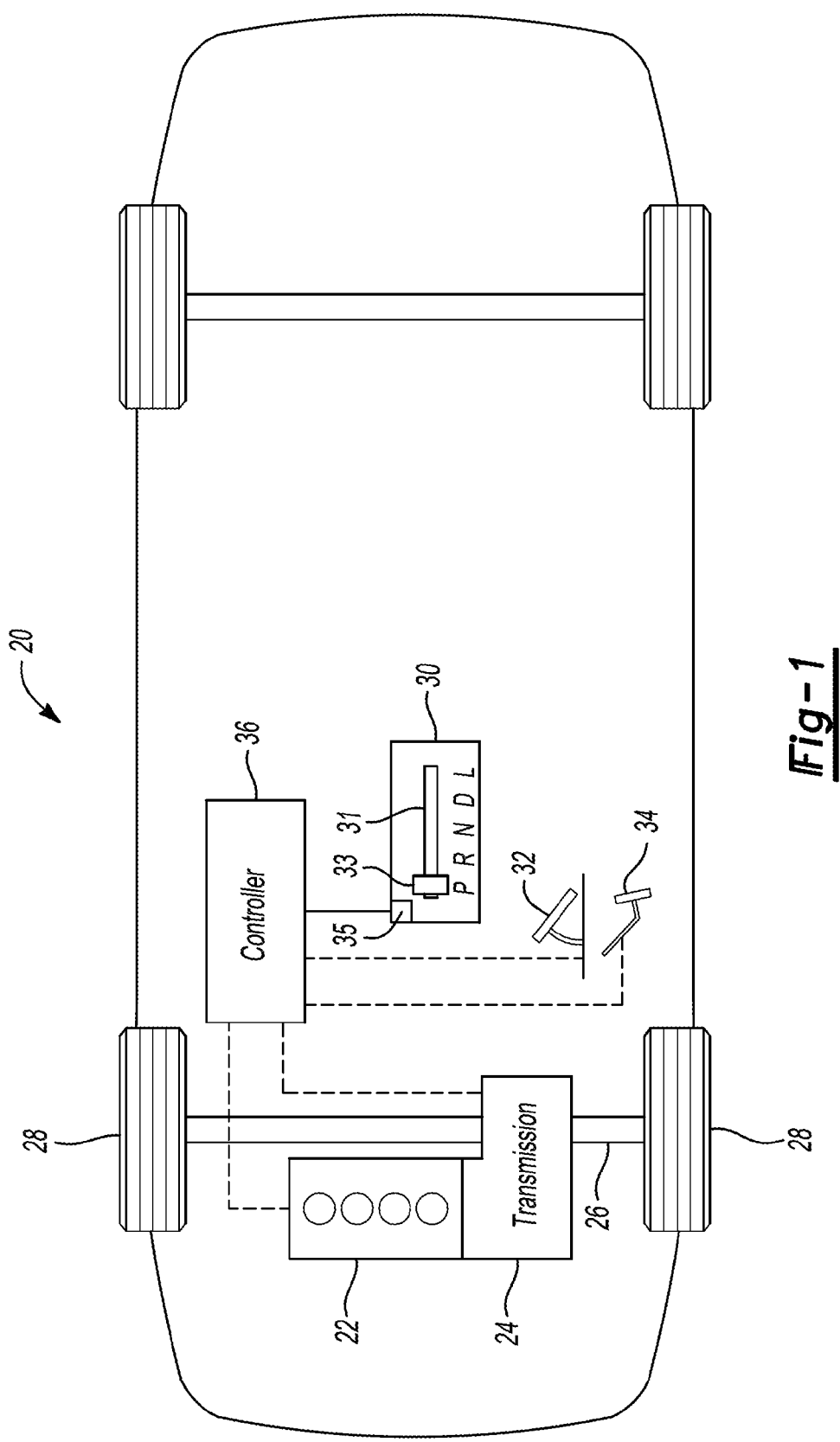
FIG. 1 is a schematic diagram of a vehicle.

An example front-wheel-drive vehicle 20 is schematically illustrated in FIG. 1. It is to be understood, however, that the vehicle could be rear-wheel drive, four-wheel drive, or all-wheel drive. The vehicle 20 includes an engine 22 coupled to a transmission 24. The transmission 24 transmits power from the engine to a differential at a shaft speed suited to current vehicle needs, which may be faster or slower than the shaft speed at which engine 22 generates power. The differential reduces the shaft speed by a fixed final-drive ratio and transmits the power to the left and right driven wheels 28 via front half shafts 26.

The vehicle 20 includes a controller 36. The controller 36 may be a vehicle-based computing system that includes one or more controllers that communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers. An example of a vehicle-based computing system is the SYNC system manufactured by THE FORD MOTOR COMPANY. The SYNC system is described in U.S. Pat. No. 8,738,574, the content of which are hereby incorporated by reference in its entirety.

The transmission 24 includes a manually-operated gear selector 30 (also known as a gear shifter) that includes at least PARK, REVERSE, NEUTRAL, and DRIVE positions. The gear selector 30 is linked to the transmission 24 (either electrically or mechanically) to place the transmission in the mode selected by the driver. In the example shifter 30, a lever 33 rides within a mode channel 31, and the driver slides the lever 33 within the channel 31 to place the lever in the desired position (e.g., DRIVE). The PRND modes may be arranged in series and require the lever to move through one or more of these modes when changing a mode of the transmission. For example, shifting to PARK from DRIVE requires the lever 33 to travel through NEUTRAL and REVERSE. Of course, other types of gear shifters exist such as pushbuttons, column mounted, and turn dials. The gear shifter 30 may include a lever-position sensor 35 configured to send a signal to the controller 36 indicative of the lever 30 position.

An accelerator pedal 32 provides operator input to control a speed of the vehicle 20. The pedal 32 may include a pedal-position sensor that provides a pedal-position signal to the controller 36, which provides control signals to the engine 22.

A brake pedal 34 provides operator input to control the friction brakes of the vehicle. The brake controller receives operator input through the brake pedal 34, and controls a friction brake system, which is operable to apply a braking force to the vehicle wheels. The pedal 34 may include a pedal-position sensor that provides a pedal-position signal to the controller 36.

Figure 2:
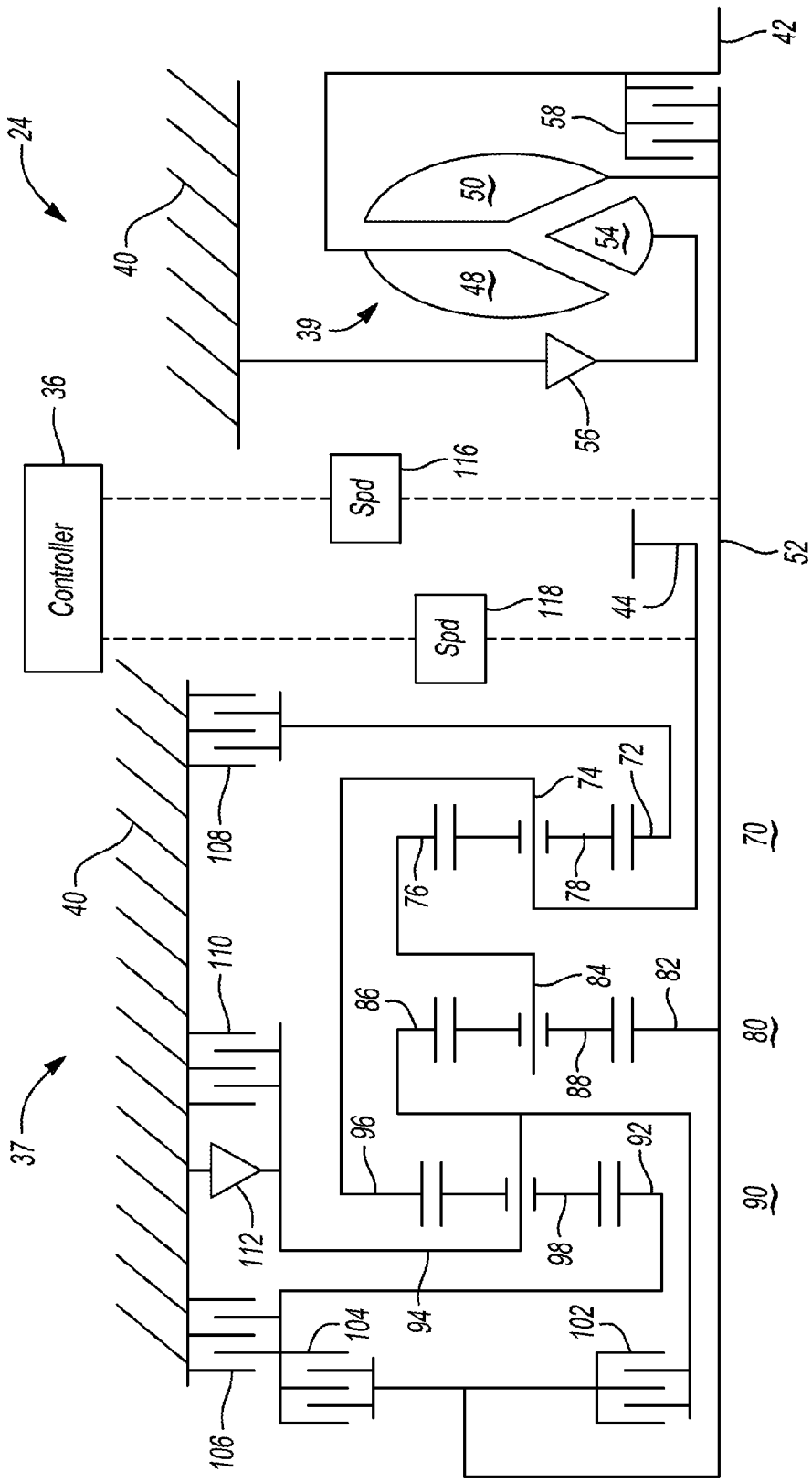
FIG. 2 is a schematic representation of a transmission according to one or more embodiments.

FIG. 2 illustrates a representative front-wheel drive automatic transmission. The transmission is contained in a housing 40 that is fixed to a vehicle structure. An input shaft 42 is driven by the engine 22. The input shaft 42 may be connected to the engine via a damper that isolates the transmission from engine-torque pulsations. An output element 44 drives the wheels 28. The output element 44 may be driveably connected to the wheels 28 via final-drive gearing and a differential. Two components are driveably connected if they are connected by a power flow path that constrains their rotational speeds to be directly proportional. The final-drive gearing transmits the power to a parallel axis and multiplies the torque by a fixed final-drive ratio. The final-drive gearing may include layshaft gears, a chain and sprockets, and/or planetary gearing. The differential divides the power between left and right front wheels while permitting slight speed differences as the vehicle turns. Some vehicles may include a power take-off unit that transfers power to rear wheels.

A torque converter 39 has an impeller 48 fixed to the input shaft 42 and a turbine 50 fixed to the turbine shaft 52. The torque converter 39 transmits torque from the input shaft 42 to the turbine shaft 52 while permitting the turbine shaft 52 to rotate slower than the input shaft 42. When the turbine shaft 52 rotates substantially slower than the input shaft 42, a torque converter stator 54 is held against rotation by the one way clutch 56 such that the torque applied to the turbine shaft 52 is a multiple of the torque supplied at the input shaft 42. When the speed of the turbine shaft 52 approaches the speed of the input shaft 42, the one way clutch 56 overruns. The torque converter 39 also includes a lock-up clutch 58 that selectively couples the input shaft 42 to turbine shaft 52.

The gear box 37 establishes a number of speed ratios between the turbine shaft 52 and the output element 44. Specifically, the gear box 37 has three planetary gear sets and six shift elements that establish six forward and one reverse speed ratio. Simple planetary gear sets 70, 80, and 90 each have a sun gear (72, 82, 92), a carrier (74, 84, 94), and a ring gear (76, 86, 96) that rotate about a common axis. Each planetary gear set also includes a number of planet gears (78, 88, 98) that rotate with respect to the carrier and mesh with both the sun gear and the ring gear. Carrier 74 is fixedly coupled to ring gear 96 and output element 44, carrier 84 is fixedly coupled to ring gear 76, ring gear 86 is fixedly coupled to carrier 94, and sun gear 82 is fixedly coupled to the turbine shaft 52.

The various speed ratios are established by engaging various combinations of shift elements. A shift element that selectively holds a gear element against rotation may be called a brake whereas a shift element that selectively couples two rotating elements to one another may be called a clutch. Clutches 102 and 104 selectively couple the turbine shaft 52 to carrier 94 and sun gear 92, respectively. Brakes 106 and 108 selectively hold sun gear 92 and sun gear 72, respectively, against rotation. Brake 110 selectively holds carrier 94 against rotation. Finally, the one way clutch 112 passively holds carrier 94 against rotation in one direction while allowing rotation in the opposite direction. The highest speed ratio (i.e., first gear) is established by engaging clutch 108 and the one-way clutch 112.

Figure 3:
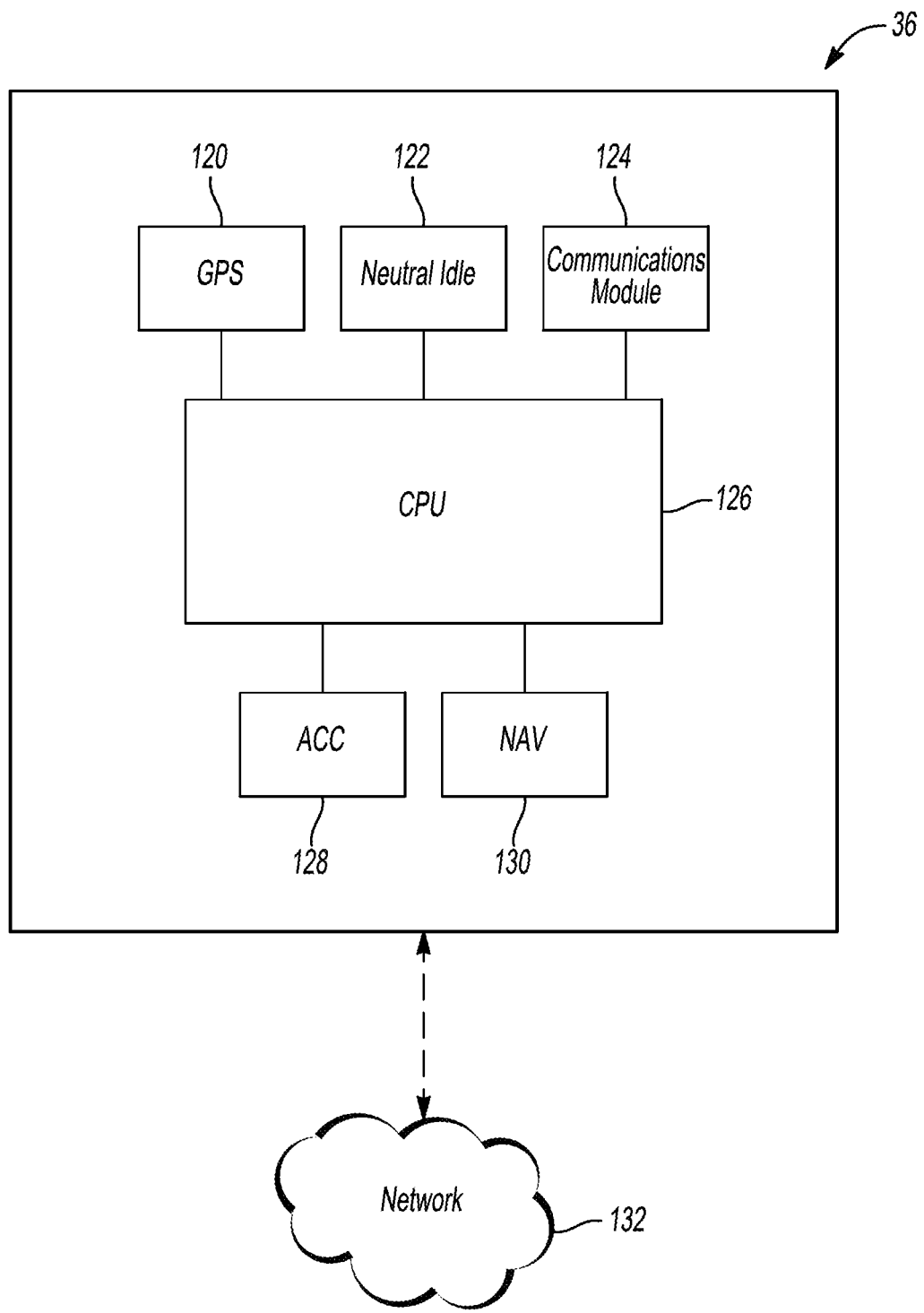
FIG. 3 is a schematic diagram of a portion of a vehicle-based computing system.

Referring to FIG. 3, the controller 36 may include a central processing unit (CPU) 38 that controls at least some portion of the operation of the vehicle-based computing system. The processor is disposed in the vehicle and allows onboard processing of commands and routines. Further, the processor is connected to both non-persistent and persistent storage. The non-persistent storage may be random access memory and the persistent storage may be a hard drive disk or flash memory.

The vehicle 20 may include a navigation system having a navigation module 130 and a global positioning system (GPS) module 120. The navigation module 130 is operable to access map data including information about the location of the road as well as traffic signal locations. For example, the map data identifies the locations of stop signs and traffic lights. Using the GPS module 120 and the navigation module 130, the controller 36 is operable to determine vehicle location on the map, vehicle heading, and vehicle speed, as well as vehicle distance to stop signs and traffic lights. The map data may be stored in memory of the controller or on a remote network 132. The controller 36 may communicate with the network 132 via a communications module 124 using known techniques. In one embodiment, the navigation system includes Electric Horizon as part of its mapping system. However, other mapping products may also be used to provide the mapping information.

The vehicle 20 may also include adaptive cruise control (ACC). ACC uses onboard sensors (such as RADAR, LIDAR, ultrasonic sensors, optical systems, and/or other sensors) to detect the distance between the host vehicle and surrounding objects such as other vehicles or traffic-control devices including stop signs and traffic lights. The ACC may be controlled by an ACC module 128 operable to automatically control the vehicle 20 using information from these sensors. For example, the ACC 128 may automatically apply the brakes if the system detects that the vehicle is approaching a red traffic light or a stop sign.

The vehicle 20 includes a neutral-idle system that automatically places the transmission in NEUTRAL when the vehicle is stopped and certain parameters are met. The neutral-idle system is controlled by a neutral-idle module 122 embedded in the controller 36. The neutral-idle module 122, in conjunction with one or more other modules, controls operation of the transmission 24 based on signals from one or more of the ACC module 128, the navigation module 130, the brake pedal 34, the accelerator pedal 32, and the gear selector 30.

Vehicle fuel economy can be increased by placing the transmission into neutral idle when the vehicle is stopped. The benefits of neutral idle depend upon the length of the stop. Relatively short stops, such as at stop or yield signs, provide little opportunity for fuel savings. On the other hand, longer stops, such as at traffic lights, provide greater opportunity for fuel savings. As such, neutral-idle systems may shift the transmission to neutral idle when the vehicle is stopped at a traffic light and not shift to neutral idle when stopped at a stop sign.

Shifting the transmission into neutral idle can cause drivability issues such as delayed acceleration under certain conditions. The delayed acceleration is caused by reduced engine torque prior to re-engagement of the forward clutch. These drivability issues tend to be more noticeable at stop signs as compared to traffic lights because drivers typically expect to stop only momentarily at stop signs.

Because engaging neutral idle at stop signs provides little fuel savings and presents drivability issues, the controller may be programmed to not shift the transmission into idle neutral when stopped at a stop sign. Vehicles equipped with a navigation module or an ACC system may use these systems to determine if the vehicle is stopped at a stop sign or at a traffic light and control the neutral-idle operation accordingly.

Figure 4:
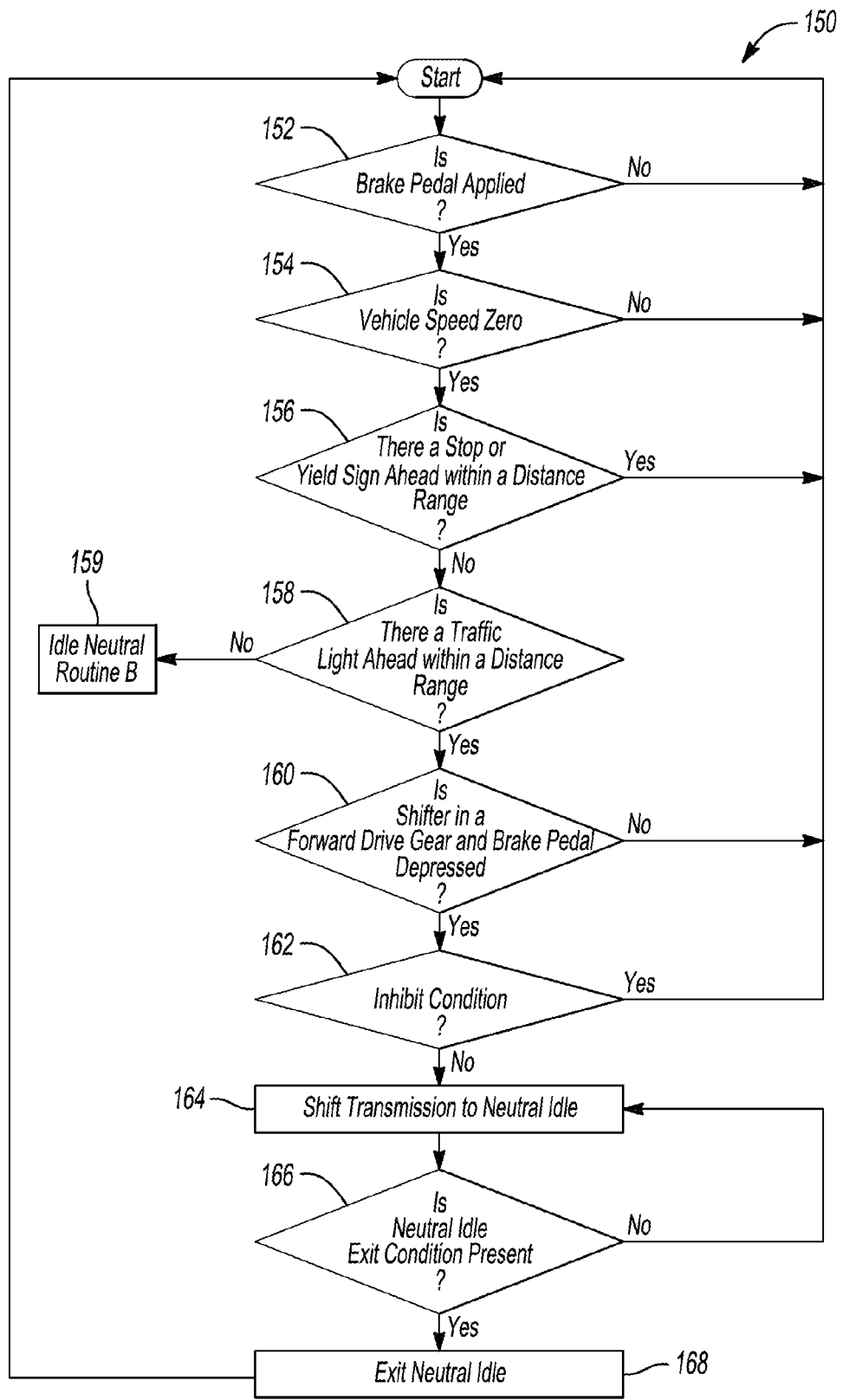
FIG. 4 is a flow chart of a method for controlling neutral idle.

Control logic or functions performed by the controller 36 may be represented by flow charts or similar diagrams, such as the flow chart 150 in FIG. 4. FIG. 4 provides a representative control strategy and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 36. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices that utilize electric, magnetic, and/or optical storage to keep executable instructions and associated calibration information, operating variables, and the like.

FIG. 4 illustrates a method 150 for operating the neutral-idle system. The method begins at operation 152 when the controller 36 determines that the brake pedal 34 is being applied. At operation 152 the controller may also determine if the vehicle is actually decelerating to differentiate between a driver decelerating the vehicle and a two-footed driver that is slightly depressing the brake pedal but is not attempting to decelerate the vehicle. If the conditions of operation 152 are present, control passes to operation 154 and the controller determines if the vehicle speed is zero (i.e., the vehicle is stopped).

If yes, the controller determines if a stop sign or a yield sign ahead of the vehicle 20 is within a predefined distance of the vehicle. The distance may be 10 to 50 feet. The controller may utilize information from the navigation module 130, the ACC module 128, or both to determine the location of the stop or yield sign relative to the vehicle 20. If the stop or yield sign is within the predetermined distance to the vehicle, then the transmission will not be shifted into idle neutral and control loops back to the start.

Control advances to operation 158 if a yield or stop sign is not within the predefined distance. At operation 158 the controller determines if a traffic light ahead of the vehicle is within a predefined distance of the vehicle. The distance may be 10 to 120 feet. The controller may utilize information from the navigation module 130, the ACC module 128, or both to determine the location of the traffic light relative to the vehicle 20.

If the traffic light is not within the predetermined distance to the vehicle, then control passes to idle-neutral routine B at operation 159. Routine B may include a delay timer that starts when the vehicle speed is zero. Once the timer expires, the transmission is shifted to neutral idle as long as all other conditions are still meet. While shown as a separate routine, routine B may be integrated with controls 150 in some embodiments.

At operation 160, the controller determines if the gear shifter 30 is in a forward drive gear (e.g., DRIVE) and if the brake pedal 34 is depressed. If both of these conditions are met, control passes to operation 162. If both of these conditions are not met, control loops back to the start. At operation 162 the controller determines if a neutral-idle inhibit condition is present. Inhibit conditions may include: the engine coolant temperature being below a threshold temperature, transmission failure conditions, brake failure conditions, or the vehicle being on a road grade that exceeds a predetermined threshold (e.g., stopped on a hill). If any of the inhibit conditions are present control loops back to the start and the transmission will not be shifted to neutral idle.

If none of the inhibit conditions are present, control passes to 164 and controller shifts the transmission 24 to neutral idle. Referring back to FIG. 2, the transmission 24 may be placed in neutral idle by disengaging the clutch 108. The torque flow path between the turbine shaft 52 and the output element 44 is interrupted when the clutch 108 is disengaged. The clutch 108 may be a hydraulically operated clutch that is controlled by a valve body of the transmission. The controller 36 controls operation of the valve body. The controller 36 may place the transmission 24 in neutral idle by commanding the valve body to supply a fluid pressure insufficient to engage clutch 108. In the illustrated embodiment, first gear includes a single controllable clutch 108 and a one-way clutch 112. Other transmissions may require engagement of multiple controllable clutches to achieve first gear. In these transmissions, neutral idle is achieved by disengaging one or more of the controllable clutches. The method 150 is also applicable to transmissions having non-hydraulically actuated shift elements. For example, the transmission may use servo motors for controlling the shift elements.

The system exits neutral idle in response one or more of the exit conditions occurring. At operation 166 the controller determines if a neutral-idle exit condition is present. Exit conditions include: the brake pedal 34 being released, the accelerator pedal being pressed, the vehicle being turned OFF, and the gear shifter being moved to a different position. In response to one or more of the exit conditions occurring, the controller, at operation 168, exits neutral idle. Neutral idle may be exited by shifting the vehicle back into a forward drive gear by re-engage the released clutch or clutches.

A typical neutral-idle system does not use map data to operate the transmission. The vehicle 20 is able to optimize the benefits of neutral idle by using inputs from the ACC module 128 and the navigation module 130. Inputs from the ACC module 128 and the navigation module 130 enable the vehicle 20 to inhibit neutral idle when advantageous and to enter neutral idle without using a delay timer resulting in increased fuel savings.

Figure 5:
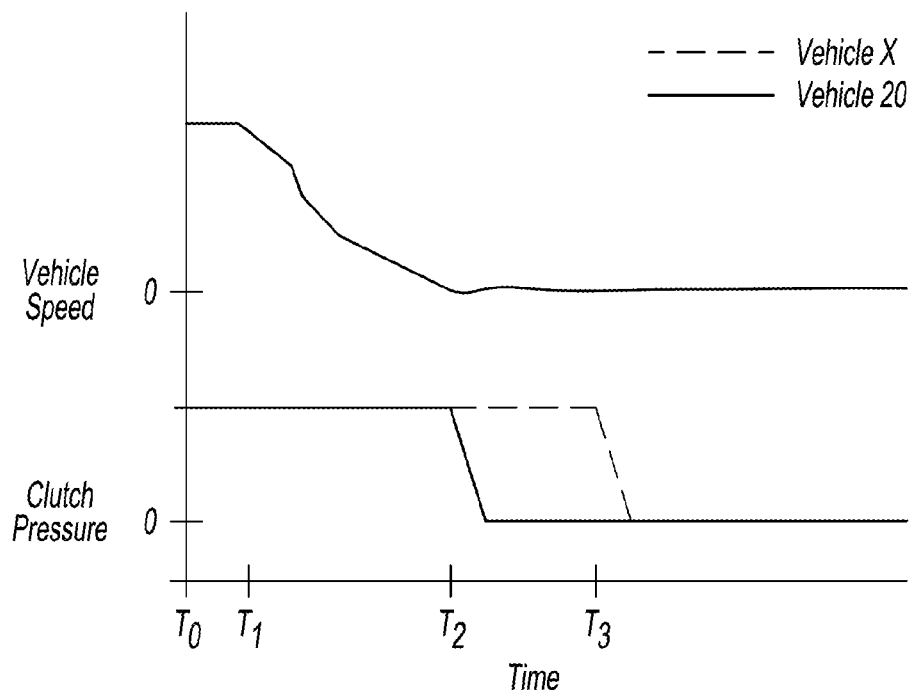
FIG. 5 shows plots illustrating vehicle parameters during an example stop at a traffic light.

FIG. 5 illustrates some example advantages of neutral-idle systems that include ACC inputs and/or navigation inputs by comparing the vehicle 20 to a vehicle (herein referred to as "vehicle X") that does not utilize information from a navigation system or an ACC system. Note: the time scale (x-axis) is not linear. At time $T_0$ both of the vehicles are traveling down the road at a nonzero velocity with the wheel brakes disengaged. At time $T_1$, the brakes of both of the vehicles are applied in response to the vehicle approaching a RED traffic light causing the vehicles to decelerate until time $T_2$, where the vehicles are completely stopped. At time $T_2$, the controller of vehicle 20 shifts the transmission to neutral idle by reducing a fluid pressure supplied to one or more of the forward clutches. In contrast, vehicle X does not enter neutral idle until time $T_3$. Vehicle X includes a delay timer that delays shifting of the transmission to neutral by a predetermined time period such as 1 to 3 seconds. Vehicle 20 does not use a delay timer because the idle-neutral system of vehicle 20 uses road data to determine if the vehicle is stopped at a traffic light or a stop sign. This allows the idle-neutral system of vehicle 20 to increase fuel economy more than the idle-neutral system of vehicle X.

Figure 6:
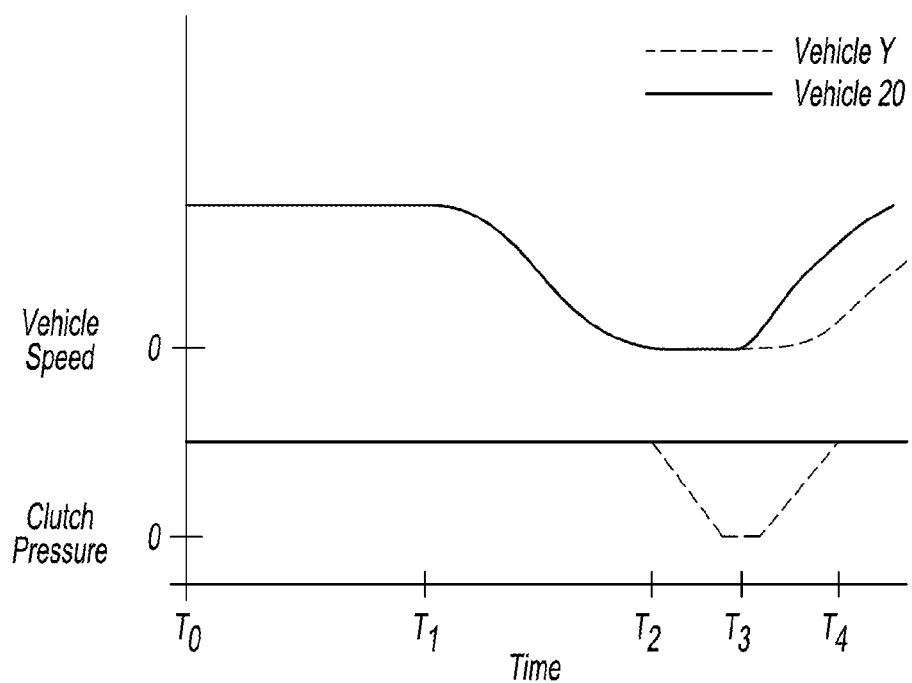
FIG. 6 shows plots illustrating vehicle parameters during an example stop at a stop sign.

FIG. 6 illustrates another example advantage of neutral-idle systems that include ACC inputs and/or navigation inputs by comparing the vehicle 20 to a vehicle (herein referred to as "vehicle Y") that does not utilize information from a navigation system or an ACC system. At time $T_0$ both of the vehicles are traveling down the road at a nonzero velocity with the friction brakes disengaged. At time $T_1$, the brakes of both of the vehicles are applied in response to the vehicle approaching a stop sign causing the vehicles to decelerate and fully stop at time $T_2$. At time $T_2$, vehicle Y shifts the transmission into neutral idle by reducing the clutch pressure to one or more of the forward clutches. In contrast, vehicle 20 does not shift the transmission to idle neutral because the vehicle is stopped at a stop sign. As such, the clutch pressure remains constant and the clutch remains engaged to maintain the transmission in DRIVE. At time $T_3$ the driver in both vehicles releases the brake and reapplies the accelerator pedal. Vehicle 20 immediately accelerates because the vehicle 20 remained in DRIVE throughout the stop. In contrast, the acceleration of vehicle Y hesitates until the forward clutch engages at time $T_4$. This hesitation is perceivable by the driver and provides an unsatisfactory driver experience. The intelligent idle-neutral system of vehicle 20 is better able to predict driving habits to improve the driving experience as compared to vehicle X and vehicle Y for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
    an engine;
    driven wheels each including an associated friction brake;
    a brake pedal operable to engage each friction brake;
    a transmission including an input element driveably connected to the engine, an output element driveably connected to the driven wheels, and a gear mechanism adapted to establish at least one torque flow path between the input element and the output element, the transmission further including a shift element that interrupts the torque flow path when disengaged;
    a gear selector including at least one forward-drive position, a reverse position, and a neutral position; and
    at least one controller configured to, in response to the gear selector being in the forward-drive position, a speed of the vehicle being zero, the vehicle being within a first predefined distance of a stoplight, and the brake pedal being depressed, disengage the shift element to put the transmission in neutral idle.

2. The vehicle of claim 1, wherein the controller is further configured to, in response to the brake pedal being released, engage the shift element.

3. The vehicle of claim 1, wherein the controller is further configured to inhibit disengagement of the shift element if the vehicle is with a second predefined distance of a stop sign.

4. The vehicle of claim 3, wherein the second predefined distance is less than the first predefined distance.

5. The vehicle of claim 1, wherein the first predefined distance is a distance ahead of the vehicle.

6. The vehicle of claim 1, wherein the first predefined distance is between 10 to 120 feet inclusive.

7. The vehicle of claim 1, wherein the controller is further configured to, in response to an accelerator pedal being depressed, engage the shift element.

8. A vehicle comprising:
   a transmission including an input element, an output element, and a shift element that interrupts torque flow between the elements when disengaged; and
   a controller configured disengage the shift element in response to a speed of the vehicle being zero, the vehicle being within a predefined distance of an ahead stoplight, and a gear selector of the transmission being in a forward-drive position.

9. The vehicle of claim 8, wherein the controller only disengages the shift element when a brake pedal is depressed.

10. The vehicle of claim 9, wherein the controller is further configured to, in response to a brake pedal being released, engage the shift element.

11. The vehicle of claim 8, wherein the controller is further configured to, in response to an accelerator pedal being depressed, engage the shift element.

12. The vehicle of claim 8, wherein the controller is further configured to, in response to the gear selector being moved from the forward-drive position, engage the shift element.

13. The vehicle of claim 8, wherein the predefined distance is between 10 to 120 feet inclusive.

14. The vehicle of claim 8, wherein the controller is further configured to inhibit disengagement of the shift element if the vehicle is with a second predefined distance of a stop sign.

15. A method of operating a vehicle having a transmission with a neutral-idle state, the method comprising:
   shifting a transmission to a forward-drive gear in response to a gear selector being in a drive position;
   engaging a brake system according to inputs from a brake pedal; and
   in response to the brake system being engaged, the vehicle being within a predefined distance of a stoplight, and the gear selector being in DRIVE, disengaging a shift element associated with the forward-drive gear to place transmission in a neutral-idle state.

16. The method of claim 15 further comprising:
   engaging the shift element in response to a gear shifter being moved from DRIVE to REVERSE.

* * * * *